US012165574B2

(12) United States Patent
Lee et al.

(10) Patent No.: US 12,165,574 B2
(45) Date of Patent: Dec. 10, 2024

(54) INTELLIGENT DISPLAY BOARD CAPABLE OF INCREASING VISIBILITY BY RESPONDING TO EXTERNAL ENVIRONMENTAL FACTORS IN REAL TIME

(71) Applicant: SAMIK ELECTRONICS IND. CO., LTD., Seoul (KR)

(72) Inventors: Jae Hwan Lee, Gyeonggi-do (KR); Gyu Sang Shim, Incheon (KR); Kwang Min Ko, Incheon (KR)

(73) Assignee: SAMIK ELECTRONICS IND. CO., LTD., Seoul (KR)

( * ) Notice: Subject to any disclaimer, the term of this patent is extended or adjusted under 35 U.S.C. 154(b) by 0 days.

(21) Appl. No.: 18/272,911

(22) PCT Filed: Oct. 26, 2021

(86) PCT No.: PCT/KR2021/015074
§ 371 (c)(1),
(2) Date: Oct. 6, 2023

(87) PCT Pub. No.: WO2022/158683
PCT Pub. Date: Jul. 28, 2022

(65) Prior Publication Data

US 2024/0078967 A1 Mar. 7, 2024

(30) Foreign Application Priority Data

Jan. 22, 2021 (KR) ........................ 10-2021-0009232

(51) Int. Cl.
*G09G 3/32* (2016.01)
*G09F 9/33* (2006.01)

(52) U.S. Cl.
CPC ................. *G09G 3/32* (2013.01); *G09F 9/33* (2013.01); *G09G 2320/0242* (2013.01);
(Continued)

(58) Field of Classification Search
CPC .......... G09G 3/30; G09G 3/32; G09G 3/3208; G09G 3/3216; G09G 3/3225;
(Continued)

(56) References Cited

U.S. PATENT DOCUMENTS

| | | | | |
|---|---|---|---|---|
| 2004/0164935 A1* | 8/2004 | Dedene | H10K 59/353 | 345/75.2 |
| 2008/0079746 A1* | 4/2008 | Ou-Yang | H04N 9/73 | 345/589 |
| 2008/0170004 A1* | 7/2008 | Jung | G09G 3/3233 | 345/76 |
| 2008/0211828 A1* | 9/2008 | Huh | H04N 21/4318 | 345/589 |

(Continued)

FOREIGN PATENT DOCUMENTS

| | | |
|---|---|---|
| JP | 2012191308 A | 10/2012 |
| KR | 10-2014-0094161 A | 7/2014 |

(Continued)

*Primary Examiner* — Ke Xiao
*Assistant Examiner* — Nelson Lam
(74) *Attorney, Agent, or Firm* — SZDC Law PC

(57) ABSTRACT

Disclosed is an intelligent display board capable of increasing visibility by responding to external environmental factors in real time. The intelligent display board aims to improve a displayed image by minimizing differences in the characteristics of a display element (LED) according to the influence of external sunlight and artificial lighting and temperature. The white color of the display board is moved to be closed to a reference if deviating the reference so that low-level colors that are ignored by sunlight, etc. are darkened and the variance of recognizable colors is increased to make it easy to distinguish, thereby increasing the visibility of the display board. In addition, luminance varying according to temperature is adjusted to compensate for and adjust an image while automatically being applicable to a surrounding environment even with respect to temperature, thereby increasing the quality of an image displayed on the display board.

5 Claims, 11 Drawing Sheets

(52) U.S. Cl.
CPC ................. *G09G 2320/041* (2013.01); *G09G 2320/0626* (2013.01); *G09G 2320/066* (2013.01); *G09G 2320/0666* (2013.01); *G09G 2360/144* (2013.01); *G09G 2360/16* (2013.01)

(58) Field of Classification Search
CPC .... G09G 3/3233; G09G 3/3241; G09G 3/325; G09G 3/3258; G09G 3/3266; G09G 3/3275; G09G 3/3283; G09G 3/3291; G09G 2320/0242; G09G 2320/041; G09G 2320/045; G09G 2320/0613; G09G 2320/0626
USPC ....................................................... 345/76–83
See application file for complete search history.

(56) References Cited

U.S. PATENT DOCUMENTS

| | | | | |
|---|---|---|---|---|
| 2010/0259175 | A1* | 10/2010 | Forster | H05B 45/28<br>315/312 |
| 2011/0095875 | A1* | 4/2011 | Thyssen | G09G 5/10<br>340/407.1 |
| 2013/0328946 | A1* | 12/2013 | Zenker | G09F 13/22<br>345/76 |

FOREIGN PATENT DOCUMENTS

| | | | |
|---|---|---|---|
| KR | 10-1738849 | B1 | 6/2017 |
| KR | 10-2019-0000765 | A | 1/2019 |
| KR | 10-2179298 | B1 | 11/2020 |
| KR | 10-2276575 | B1 | 7/2021 |
| KR | 10-0350306 | B1 | 8/2022 |

* cited by examiner

[FIG. 1]
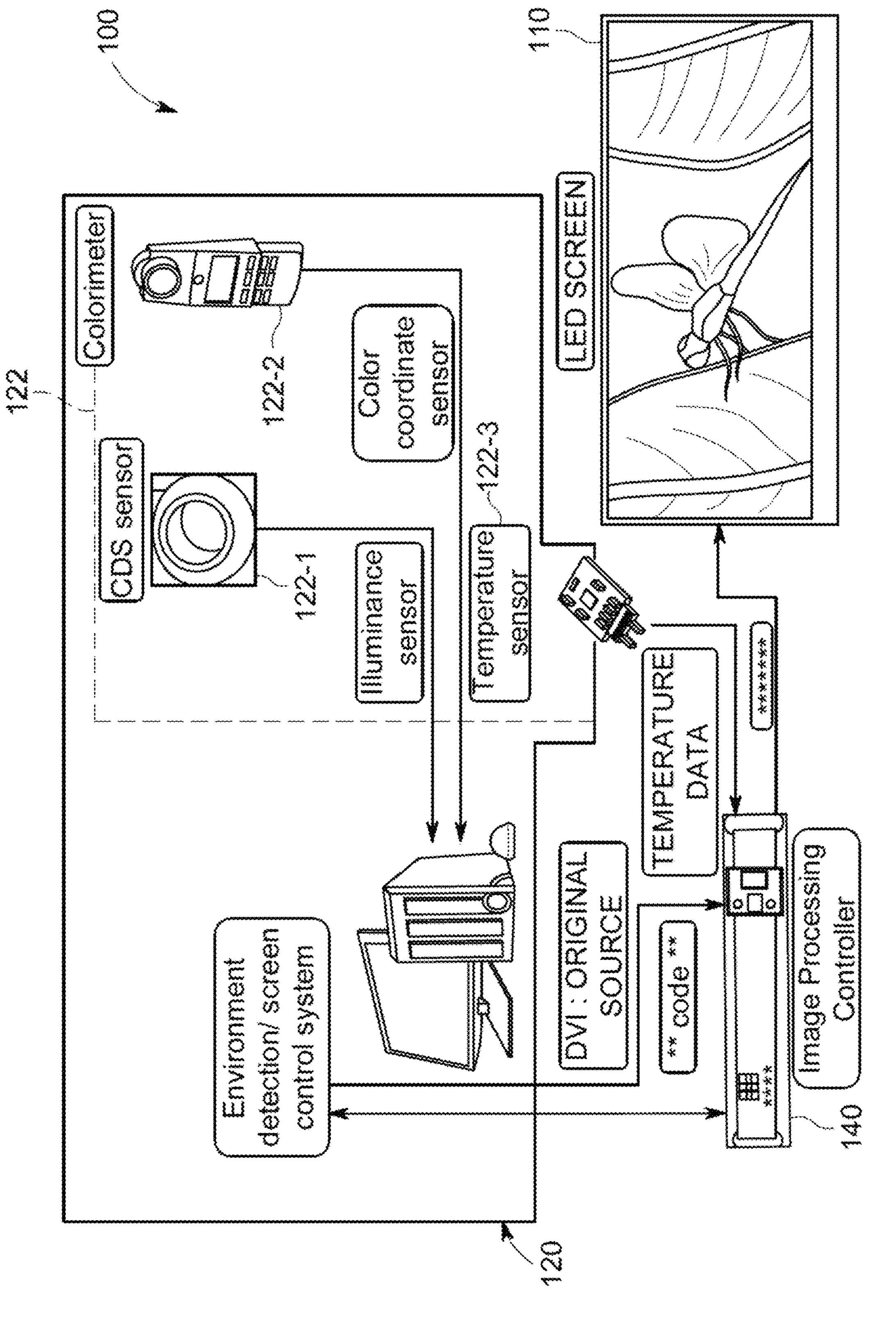

[FIG. 2]
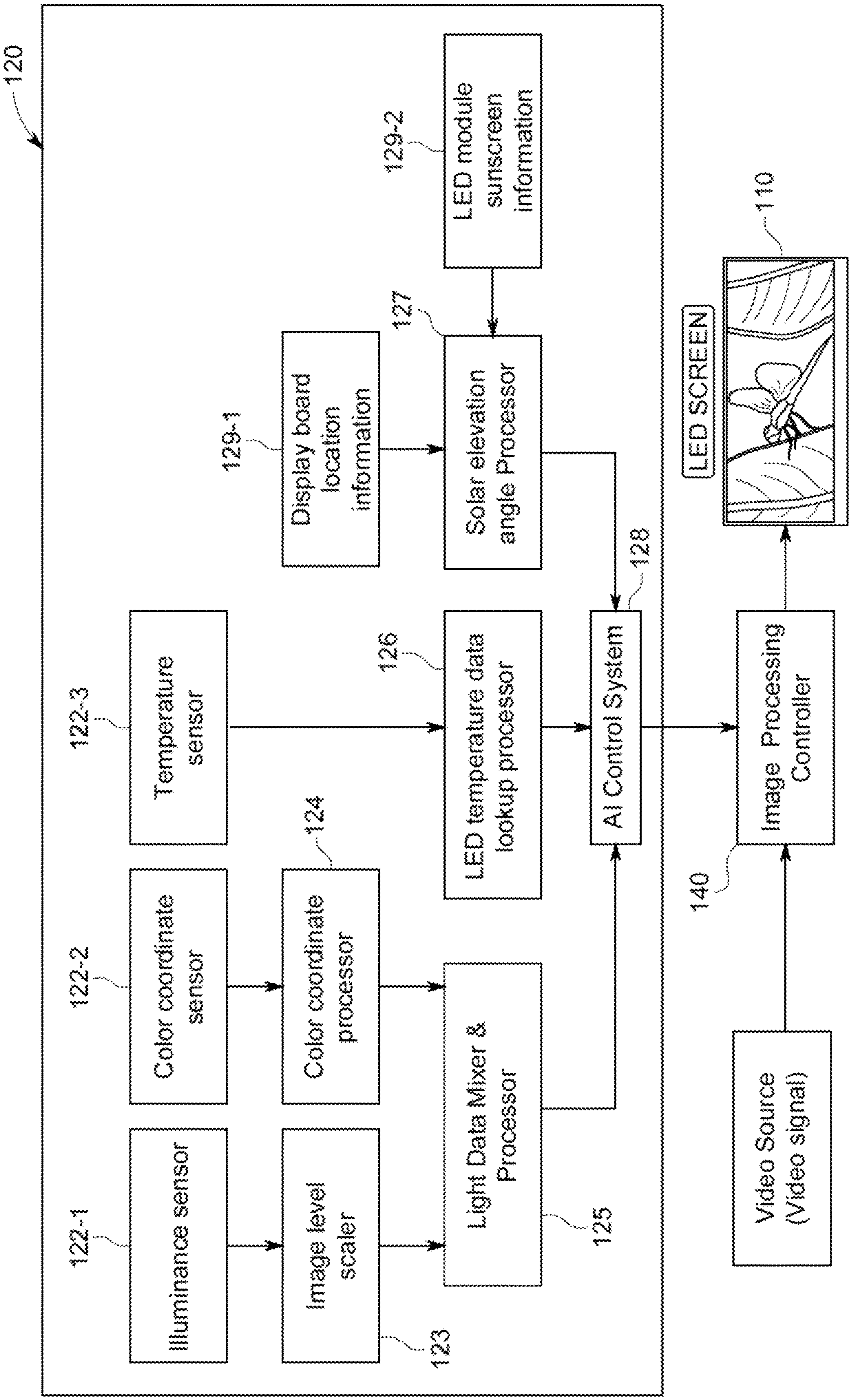

[FIG. 3]
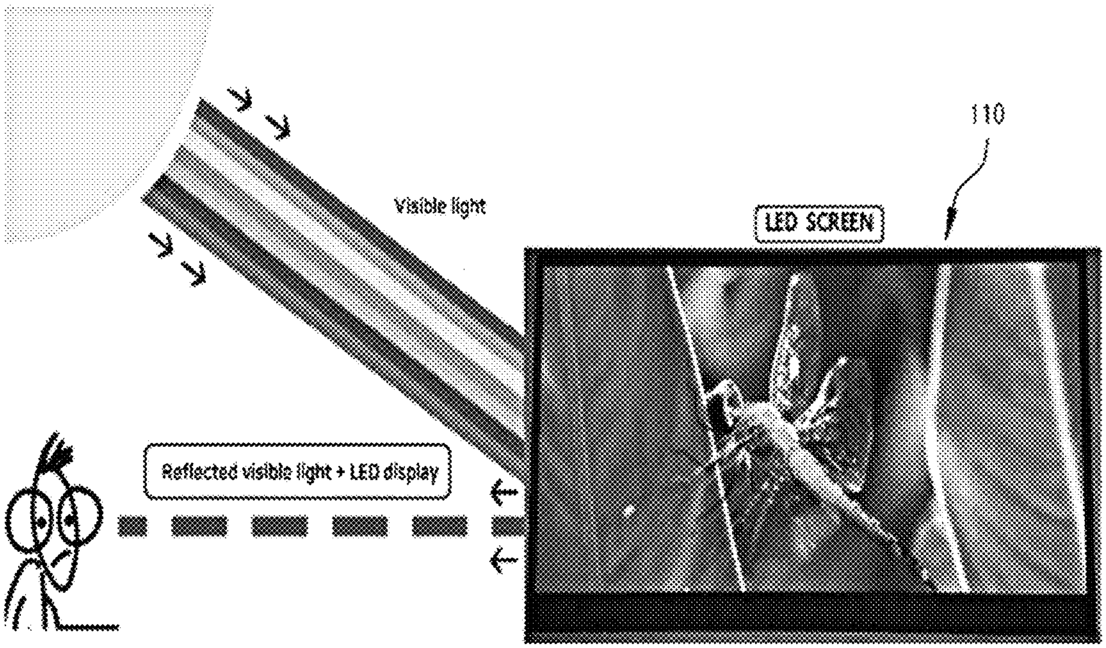
[FIG. 4]
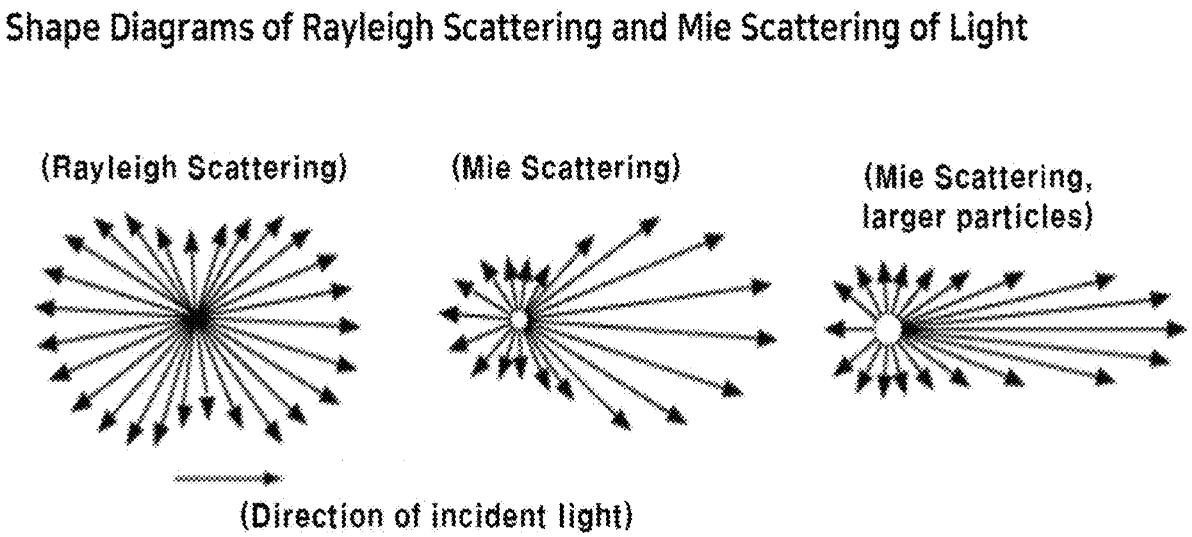

[FIG. 5]
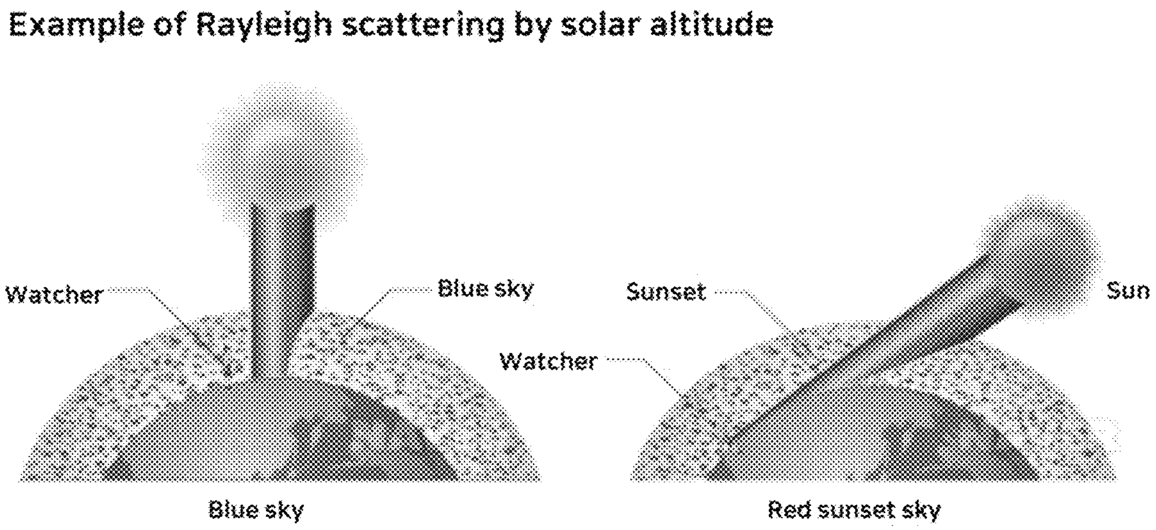
[FIG. 6]
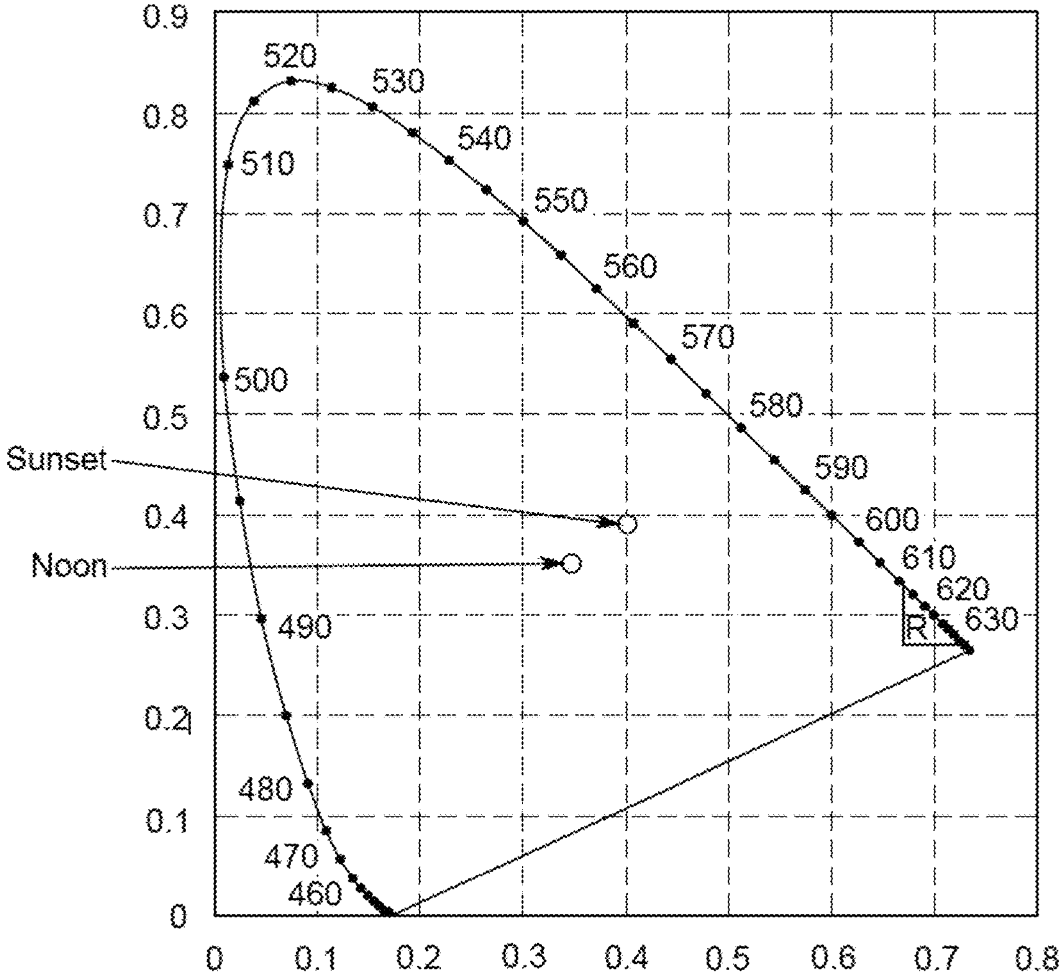

[FIG.7]
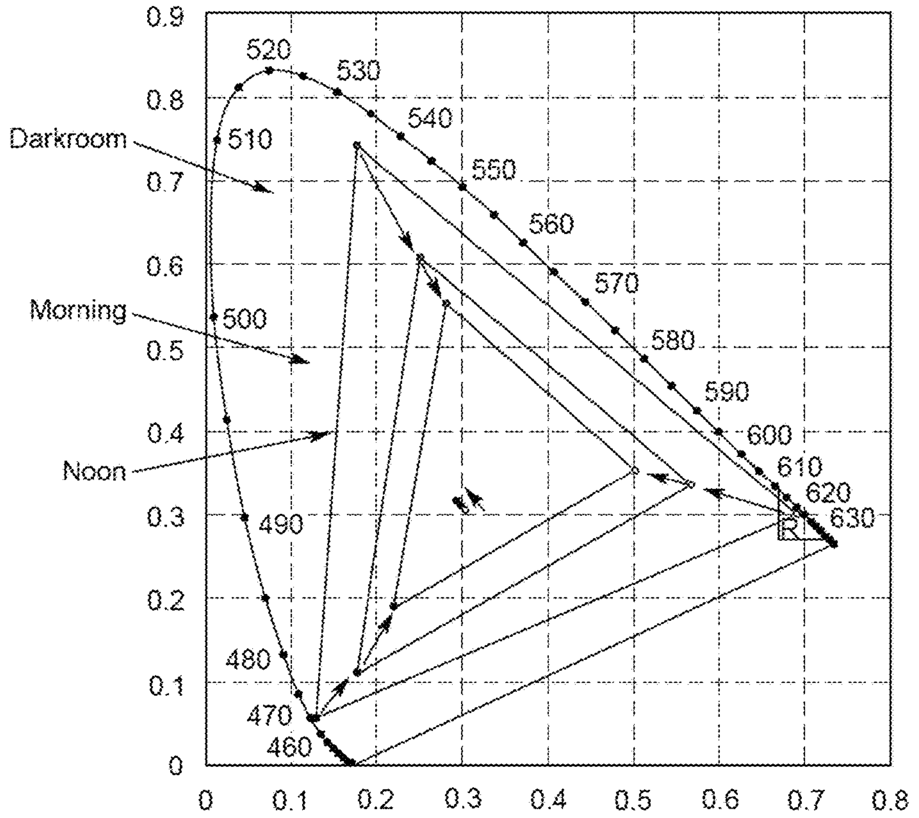
[FIG.8]
Example of altitude information collection site
(a) Site screen example
(b) Altitude/azimuth example
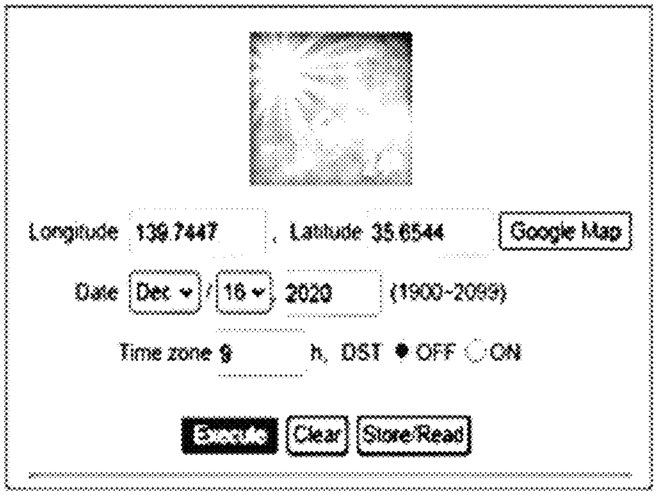
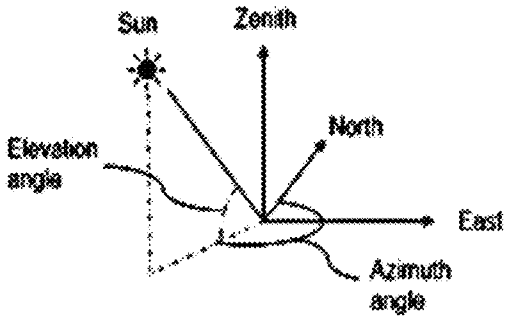

[FIG.9]
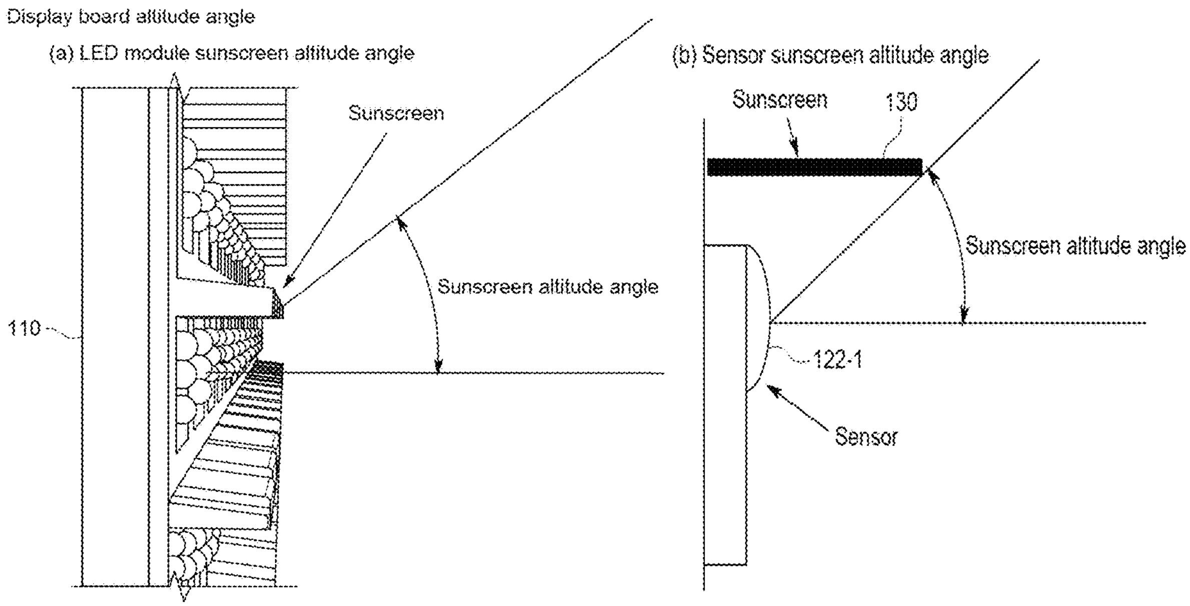

[FIG.10]
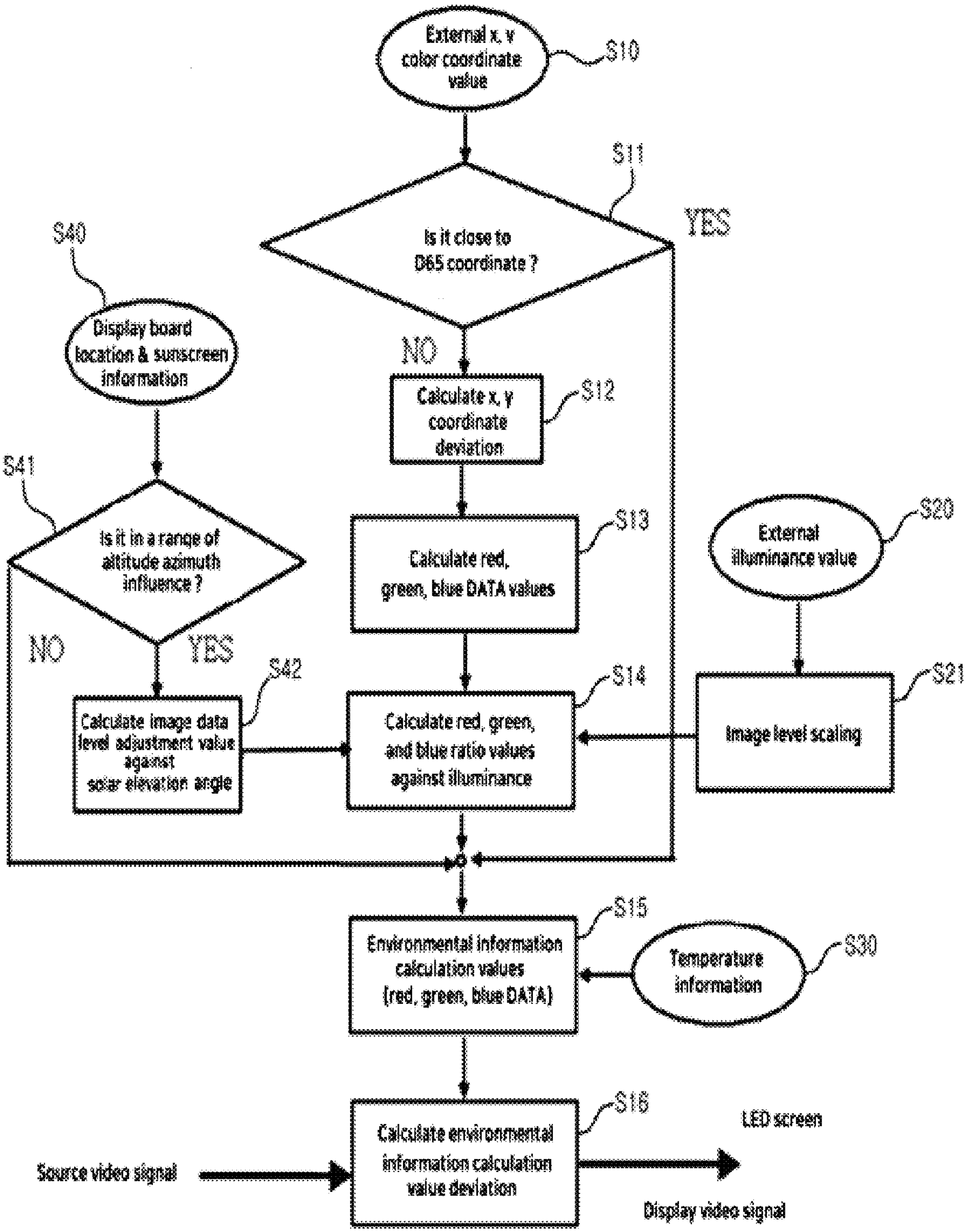

[FIG.11]

Examples of display board environment value in morning of day 1

(a) Temperature, fine dust, solar elevation angle and azimuth illuminance, and color coordinate measurement values per each time Solar illuminance & color coordinate values

| [illegible] | [illegible] | [illegible] | PM25 | PM10 | [illegible] | [illegible] | [illegible] | X [illegible] | Y [illegible] | [illegible] |
|---|---|---|---|---|---|---|---|---|---|---|
| [08:31:00] | | | 25 μg/m³ | 34 μg/m³ | 7.2838 | 127.1371 | 4956 | 0.3198 | 0.3413 | 6091 |
| [08:41:00] | | | 25 μg/m³ | 34 μg/m³ | 8.8467 | 128.8327 | 6737 | 0.3228 | 0.3449 | 5937 |
| [08:51:00] | -6.1℃ | | 25 μg/m³ | 34 μg/m³ | 10.3723 | 130.5698 | 19970 | 0.3794 | 0.3783 | 4039 |
| [09:01:00] | -5.2℃ | Sunny | 25 μg/m³ | 34 μg/m³ | 11.8584 | 132.3504 | 26190 | 0.3741 | 0.3769 | 4177 |
| [09:11:00] | -4.9℃ | Sunny | 25 μg/m³ | 34 μg/m³ | 13.3024 | 134.1764 | 30940 | 0.3698 | 0.3752 | 4293 |
| [09:21:00] | -4.2℃ | Sunny | 28 μg/m³ | 37 μg/m³ | 14.7018 | 136.0494 | 35770 | 0.3654 | 0.3731 | 4412 |
| [09:41:00] | -3.9℃ | Sunny | 28 μg/m³ | 37 μg/m³ | 17.356 | 139.9425 | 45930 | 0.3575 | 0.3689 | 4639 |
| [09:51:00] | -2.5℃ | Sunny | 28 μg/m³ | 37 μg/m³ | 18.6052 | 141.965 | 49000 | 0.3556 | 0.3679 | 4699 |
| [10:01:00] | -2℃ | Sunny | 28 μg/m³ | 37 μg/m³ | 19.7986 | 144.0392 | 53930 | 0.3537 | 0.3673 | 4757 |
| [10:11:00] | -1.1℃ | Sunny | 28 μg/m³ | 37 μg/m³ | 20.9331 | 146.1657 | 57790 | 0.3523 | 0.3669 | 4801 |
| [10:21:00] | -0.9℃ | Sunny | 33 μg/m³ | 45 μg/m³ | 22.0057 | 148.3443 | 60530 | 0.3513 | 0.3664 | 4837 |
| [10:31:00] | -0.6℃ | Sunny | 33 μg/m³ | 45 μg/m³ | 23.0134 | 150.5748 | 65090 | 0.3498 | 0.3654 | 4881 |
| [10:41:00] | -0.6℃ | Sunny | 33 μg/m³ | 45 μg/m³ | 23.9531 | 152.8561 | 50230 | 0.3492 | 0.3662 | 4897 |
| [10:51:00] | -0.3℃ | Sunny | 33 μg/m³ | 45 μg/m³ | 24.8217 | 155.187 | 11030 | 0.331 | 0.3551 | 5572 |
| [11:01:00] | -0.2℃ | Sunny | 33 μg/m³ | 45 μg/m³ | 25.6164 | 157.5653 | 9351 | 0.3277 | 0.3531 | 5710 |
| [11:11:00] | -0.2℃ | Sunny | 33 μg/m³ | 45 μg/m³ | 26.3343 | 159.9886 | 14520 | 0.3312 | 0.3548 | 5565 |
| [11:21:00] | 0℃ | Sunny | 43 μg/m³ | 62 μg/m³ | 26.9727 | 162.4536 | 27700 | 0.3295 | 0.3516 | 5635 |
| [11:31:00] | 1.1℃ | Sunny | 43 μg/m³ | 62 μg/m³ | 27.5291 | 164.9567 | 78480 | 0.3496 | 0.3669 | 4895 |
| [11:41:00] | 1.1℃ | Sunny | 43 μg/m³ | 62 μg/m³ | 28.0013 | 167.4933 | 79750 | 0.3464 | 0.3644 | 5000 |
| [11:51:00] | 1.8℃ | Sunny | 43 μg/m³ | 62 μg/m³ | 28.3873 | 170.0567 | 82040 | 0.3462 | 0.3644 | 5008 |
| [12:01:00] | 2.3℃ | Sunny | 43 μg/m³ | 62 μg/m³ | 28.6855 | 172.6475 | 82930 | 0.3459 | 0.3641 | 5014 |
| [12:11:00] | 2.2℃ | Sunny | 43 μg/m³ | 62 μg/m³ | 28.8945 | 175.2538 | 84340 | 0.3467 | 0.3648 | 4991 |
| [12:21:00] | 2.8℃ | Sunny | 42 μg/m³ | 55 μg/m³ | 29.0134 | 177.8716 | 84360 | 0.3471 | 0.3651 | 4978 |
| [12:31:00] | 2.6℃ | Sunny | 42 μg/m³ | 55 μg/m³ | 29.0417 | 180.4947 | 86580 | 0.3467 | 0.3648 | 4989 |
| [12:41:00] | 2.6℃ | Sunny | 42 μg/m³ | 55 μg/m³ | 28.9792 | 183.1165 | 83370 | 0.346 | 0.3638 | 5015 |
| [12:51:00] | 3.5℃ | Sunny | 42 μg/m³ | 55 μg/m³ | 28.8262 | 185.7307 | 84830 | 0.3463 | 0.3642 | 5000 |

(b) Color coordinates of sunlight shining on display board

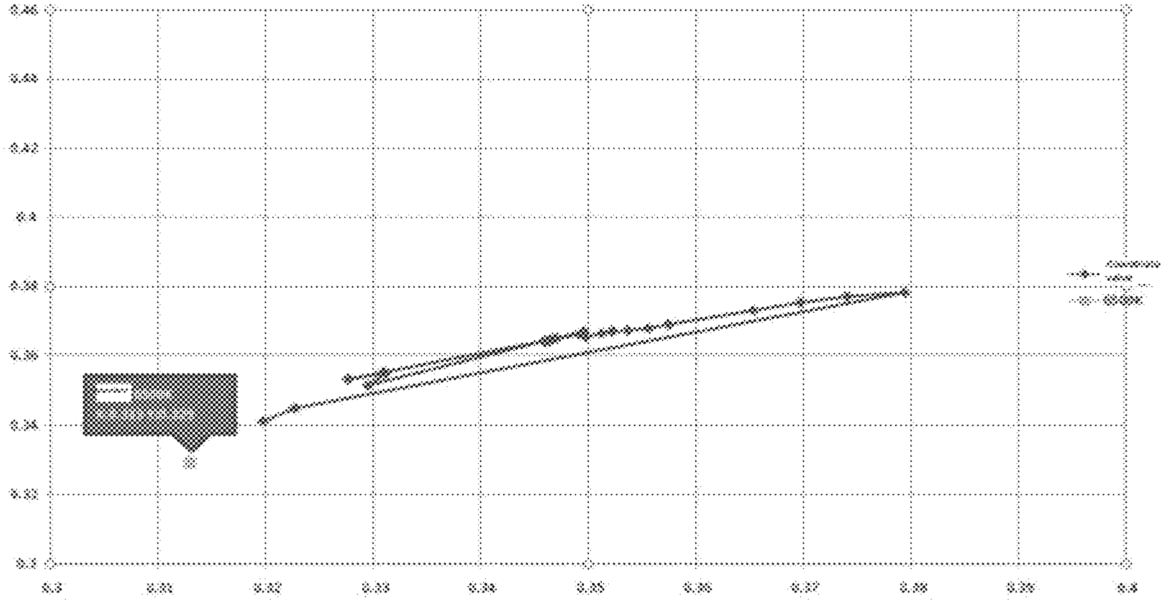

[FIG.12]
Graph showing daily measured sunlight in color coordinates
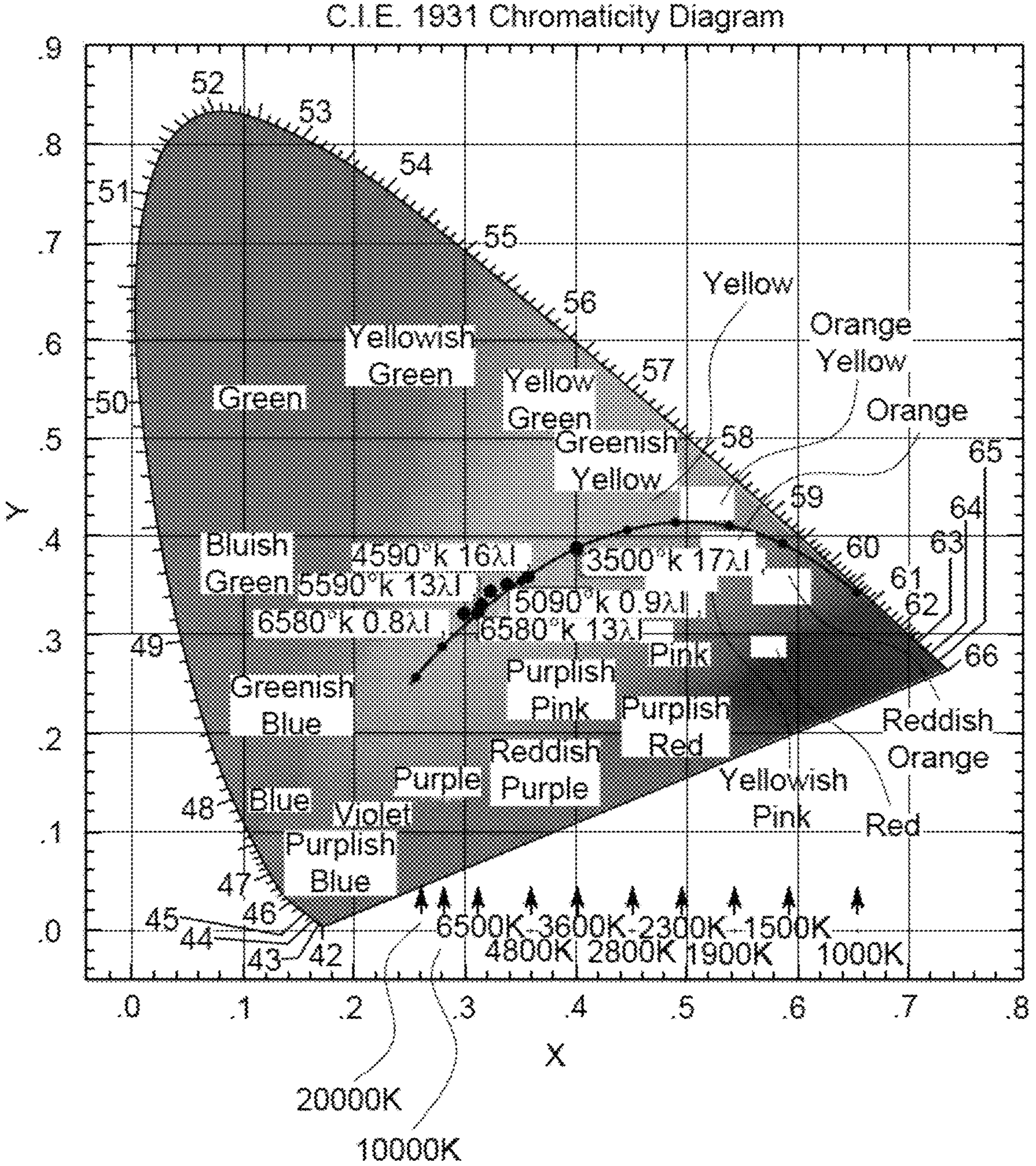

[FIG.13]
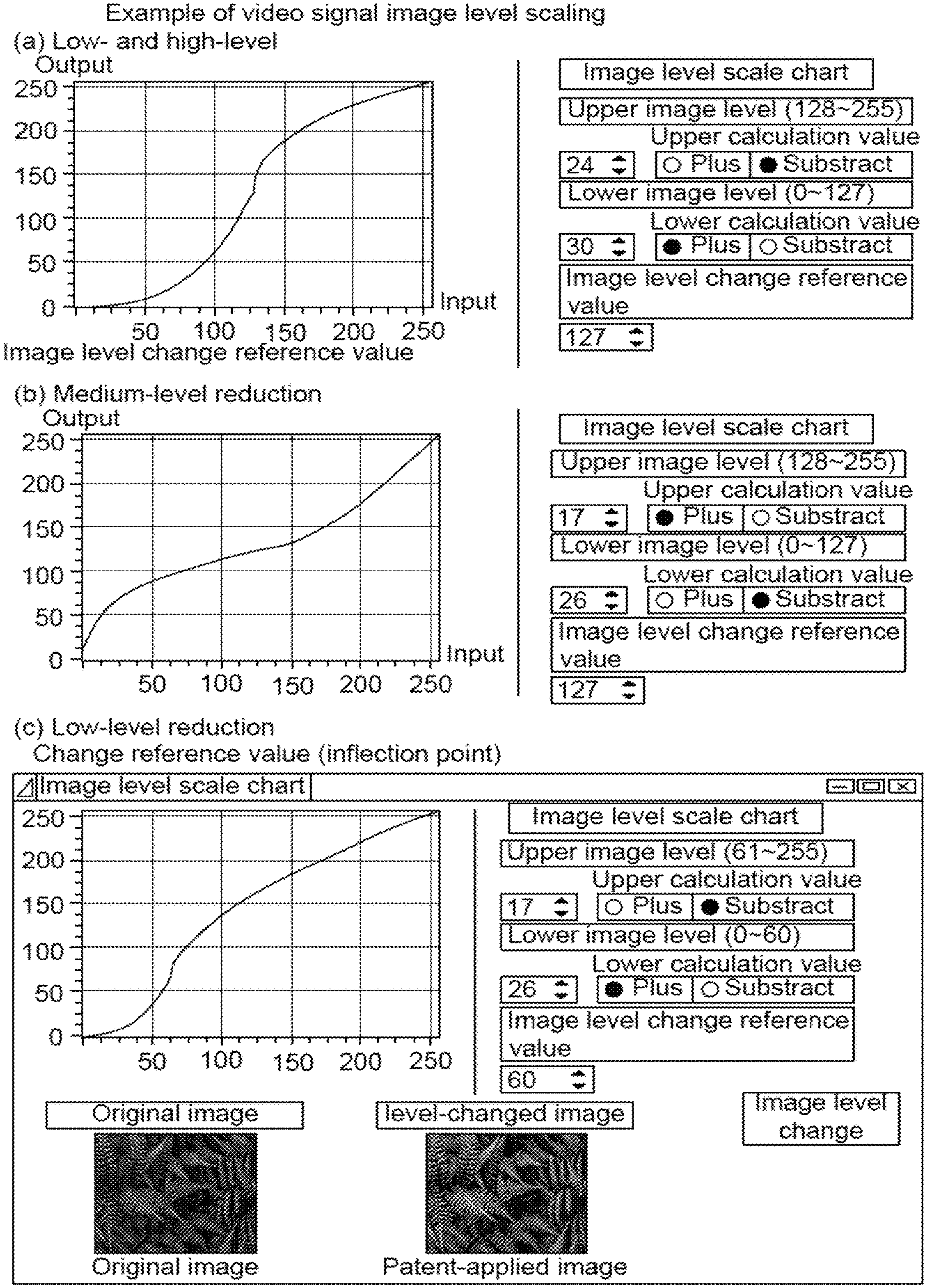

[Fig.14]
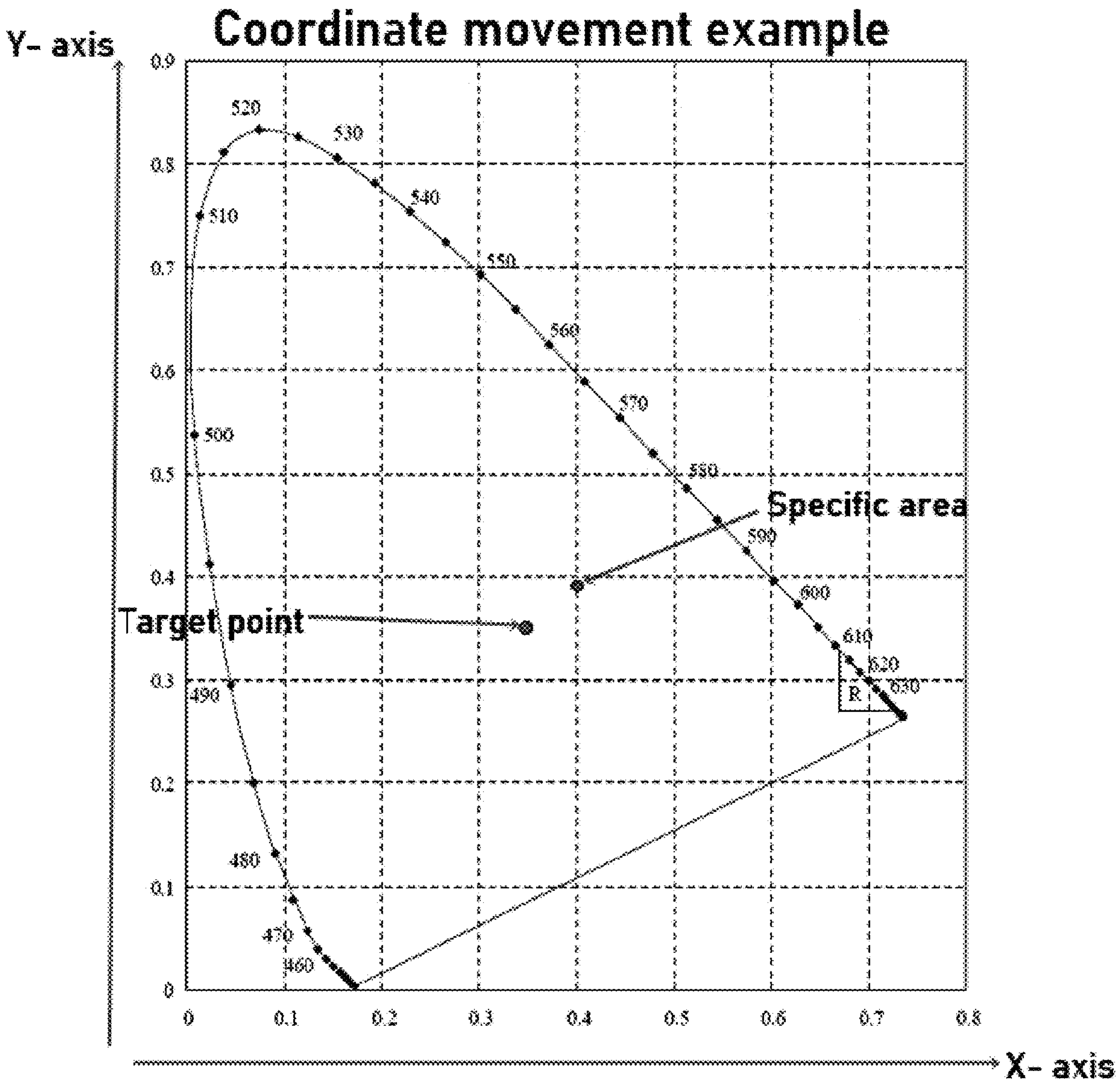

INTELLIGENT DISPLAY BOARD CAPABLE OF INCREASING VISIBILITY BY RESPONDING TO EXTERNAL ENVIRONMENTAL FACTORS IN REAL TIME

This application is the National Stage Application of PCT/KR2021/015074, filed on Oct. 26, 2021, which claims priority to Korean Patent Application No. 10-2021-0009232, filed on Jan. 22, 2021, which is incorporated by reference for all purposes as if fully set forth herein.

TECHNICAL FIELD

The present disclosure relates to an intelligent display board capable of increasing visibility by responding to external environmental factors in real time, and more particularly to a display board capable of preventing degradation of image quality due to color displacement by adjusting the color, luminance, and white balance expressed on the display board to be close to a desired color even when an external light source such as sunlight or external light shines on the display board.

BACKGROUND ART

Television broadcasting is increasing in definition to 4K and 8K, and the display board market is also increasing in scale as it is integrated into the signage market. It is expected that the use of display boards, which are media, will further increase in the future, and with the development of digital technology, display boards are entering an era in which high definition is required.

However, as demand for a display board installed in residential or commercial areas increases, the brightness of a display board is limited at night due to the "Act on Prevention of Light Pollution by Artificial Lighting." This indicates that a Light Emitting Diode (LED) display board is used closely in life in modern society. As such demand is increasing, technological advances are also being made.

The most ideal thing in a display device is to reproduce nature as it is. However, complete reproduction is impossible due to limitations in imaging equipment or display device characteristics and technology. In addition, it is well known that the quality of a displayed image is degraded due to light distortion due to external influences.

Human vision perceives objects or colors by receiving light, such as sunlight or other light sources, reflected from objects. The information of a display board is also reproduced in various colors by the combination of red, green, and blue of LED, which is a light-emitting element, and this light reaches the human eye so that the information content of the display board can be recognized. The place where a display board is installed is also diverse, so outdoor use is placed under the influence of the sun. In the case of indoors, a display board is directly or indirectly affected by indoor lighting, and light combined with a light source expressed on the display board and an external light source is visible to people.

A white balance of a display board is mainly measured in a dark room to determine the standard, and used after slight adjustment according to an installation location. However, a display board installed outdoors is affected differently depending on a direction. A display board installed facing east receives direct sunlight in the morning, while a display board facing west receives direct sunlight at sunset.

The sunlight has various color temperatures, such as red sunlight, yellow sunlight, and blue sunlight, depending on the angle of the sun or the weather. Earth's atmosphere contains air containing nitrogen and oxygen, as well as water vapor and fine dust, which affect the scattering of light. Specifically, sunlight at noon is blue, and sunset is red. Light scattering refers to a phenomenon in which light meets particles and is scattered in various directions different from the travel direction thereof. As examples of light scattering, there are Rayleigh scattering and Mie scattering.

Since the size of particles causing scattering is very small, Rayleigh scattering occurs when the size of the particle is smaller than the wavelength of light. The scattering angle θ at which sunlight is scattered by gas molecules as it passes through the atmosphere has the formula "light intensity ∝ 1/(wavelength) 4th power", which is inversely proportional to the 4th power of the wavelength, so blue light, which has the shortest wavelength in visible light, is scattered at a much greater angle than red light, which has the longest wavelength.

Such Rayleigh scattering causes a blue sky or a red sunset in the evening. When this sunlight is directly reflected on a display board, the sunlight at noon is illuminated as blue-based light with a high color temperature, and in the morning and evening, reddish light with a low color temperature is reflected on a display board due to the sunset phenomenon, so the white balance of the display board is not the same.

On the other hand, Mie scattering refers to the scattering of light scattered from materials with particles larger than the wavelength. Since Mie scattering appears in water molecules of water vapor, fine dust, and pollen, it causes the sky to be hazy when there is a lot of fine dust or pollen in spring.

In addition to the scattering of light as described above, there is a Purkinje's phenomenon effect. This phenomenon is a phenomenon in which the visibility of color light varies depending on the light-dark adaptation state. Since red or vermilion appears relatively bright during light adaptation, and blue appears relatively bright during dark adaptation, it is desirable to implement the color of a display board to correspond to the visibility. In addition, LEDs are sensitive to temperature, so their brightness and wavelength change according to the ambient temperature. In particular, RED LEDs are very sensitive and have a high luminous intensity at low temperatures and a low luminous intensity at high temperatures, resulting in red-based white in winter and blue-based white in summer. As examples of such a display board having a function of correcting according to the temperature, there are Korean Patent Nos. 10-0350306 and 10-1738849, entitled "DISPLAY BOARD WHITE BALANCE MAINTENANCE DEVICE," filed by the applicant of the present invention.

In this way, advanced high-definition is being achieved through the development of a display board manufacturing and correction technology. However, the visibility of a display board that is actually installed outdoors or indoors is still declining due to external sunlight or interference from lighting. In other words, LED display boards that deliver information to the public are usually installed in public places, there are very few outdoor LED display boards that face north, where the sun is less affected, and there are many south, east, or west orientations due to the nature of the locations, so LED display boards are exposed to sunlight and are greatly affected by sunlight.

In the morning or evening when the sun is at a low altitude, red-colored sunlight with a low color temperature is reflected on a display board due to light scattering, and at noon when the sun is at a high altitude, a display board receives light with a high color temperature, so a display board light is displayed in a state affected by sunlight.

In general, sunlight at noon has a color temperature of around 5,400° K, daytime light on a cloudy day has a color temperature of 6500 to 7000° K, and blue sky on a clear day has a color temperature of about 12,000 to 18,000° K.

In addition to these colors, the brightness of sunlight is affected by the intensity of the light, and it varies somewhat depending on the place. As results of the measurement, it is around 5,000 lx) in the shade, around 7,500 lx in the morning and evening when the sunset occurs, and around 80,000 to 100,000 when the midday sun is strong, but these values are only reference values, not absolutes, because there are many factors such as temperature, season, and fine cloudiness.

Table 1 below shows illuminances and color coordinates measured on a clear day in the fall. These results are examples measured with an instrument facing due south, and some cloud influences should be considered.

TABLE 1

| Time | Illuminance (lx) | Color temperature (° K) | Coordinates |
|---|---|---|---|
| Morning | 2,513 | 4,784 | x-0.3496<br>y-0.3546 |
| Noon | 50,000 | 5,169 | x-0.3470<br>y-0.3553 |
| Sunset | 7,500 | 3,500 | x-0.4030<br>y-0.3884 |

Table 1 shows that sunlight with a color temperature of 5,100° K is scanned near noon, and red sunlight with a color temperature of 3,500° K is shining at sunset. FIG. 6 illustrates the color coordinate positions of daylight at sunset and noon. When a display board receives sunlight, the sunlight with a different color is added to the display board, and a display board LED light is expressed in an affected state, the display board LED light is affected as shown in FIG. 7.

FIG. 7 is a diagram illustrating a color coordinate shift state of a display board affected by sunlight.

Since data measured in a darkroom is the color of the unique wavelength of LED, as in the darkroom of FIG. 7, it is possible to reproduce colors in a wide range and express vivid and pure colors. However, when sunlight is added, red, green, and blue move toward white. The movement range is moved more as the intensity of sunlight increases, and the color reproduction range is very narrow, resulting in a blurry feeling on a display board image and, accordingly, resulting in a deterioration in image quality. Examining the central whiteness, it moves according to the color and intensity of sunlight, and the white balance measured in a dark room and taken as a standard moves away from the target point. Since this color shift causes a deterioration of the image quality of a display board, the most ideal thing is to make it be expressed identically to the measurement range of the darkroom, and, although it is impossible in reality, it is to move optimally to the target point.

In addition, when sunlight shines on a display board, the contrast is lowered due to sunlight reflection, so it looks hazy, black does not look black, becomes gray, is attenuated in dark color and becomes invisible. Accordingly, it is desirable to adjust this.

Therefore, there is an urgent need for the development of a display board capable of preventing image quality deterioration, caused by color displacement due to changes in color, luminance, and white balance expressed on the display board, even when an external light source such as sunlight or external light shines on the display board.

RELATED ART DOCUMENTS

Patent Documents (Patent Document 1) Korean Patent No. 10-0350306
(Patent Document 2) Korean Patent No. 10-1738849

DISCLOSURE

Technical Problem

Therefore, the present disclosure has been made in view of the above problems, and it is one object of the present disclosure to provide an intelligent display board capable of improving a displayed image by minimizing differences in the characteristics of a display element (LED) according to the influence of external sunlight and artificial lighting and temperature. The white color of the display board is moved to be closed to a reference if deviating the reference so that low-level colors that are ignored by sunlight, etc. are darkened and the variance of recognizable colors is increased to make it easy to distinguish, thereby increasing the visibility of the display board. In addition, luminance varying according to temperature is adjusted to compensate for and adjust an image while automatically being applicable to a surrounding environment even with respect to temperature, thereby increasing the quality of an image displayed on the display board.

Technical Solution

In accordance with an aspect of the present invention, the above and other objects can be accomplished by the provision of An intelligent display board capable of increasing visibility by responding to external environmental factors in real time, including: an LED screen; a controller including sensors configured to collect external information affecting the LED screen and detect illuminance, color coordinates, and temperature, respectively; and an Artificial Intelligence (AI) control system configured to calculate an adjustment value by adjusting image data comprehensively with a processor configured to generate data to drive the LED screen by information respectively collected from the sensors; and an image processing controller configured to display an image with improved image quality on the LED screen by applying an adjustment value corresponding to an environment of the AI control system to video source image data.

The controller may include: sensors including an illuminance sensor, color coordinate sensor, and temperature sensor to respectively detect illuminance, color, and temperature of light, respectively, so as to respond to influence of external environmental factors; an image level scaler configured to set a certain section of a video signal and to selectively adjust a video signal level by distinguishing low, medium, and high levels so as to increase visibility of an LED screen, which has been dimmed due to lowered contrast, to an intensity of light measured from the illuminance sensor; a color coordinate processor configured to, when determining whether it is near D65 coordinates by reading x, y color coordinates of an external light source measured from the color coordinate sensor, calculate red, green, and blue data values necessary for moving coordinates by omitting an operation for x, y coordinates and, when coordinate values with a large color deviation are read, by executing x, y color correction; a light data mixer & processor configured to adjust and calculate the influence of external light sources such as sunlight or lighting by mixing a video image level change for an illuminance value of an external light source output from the image level scaler and red, green, and blue data values of external light source color coordinates output from the color coordinate processor; a sun altitude processor configured to calculate an altitude and azimuth of sun, which is an external light source, by determining a state of sunlight influence by display board location information and LED module sunscreen information that forms a display board sun shade, and to perform a calculation to adjust only an LED brightness by temperature without adjustment when the altitude or azimuth of the sun has no effect on a display board; an LED temperature data lookup processor configured to memorize several LED temperature characteristics and to calculate correction data that can be added or subtracted according to a temperature measured from the temperature sensor; and an AI control system configured to calculate a comprehensive adjustment value by integrating output data of the light data mixer & processor, output data of the sun altitude processor, LED temperature characteristic information, and external use environment information of a display board.

The image level scaler may use, as variables, an upper image level g1, an upper image level g2 and an image level change reference value s for distinguishing between upper and lower image levels, in response to influence of external light source illuminance, and a level of a video signal may be changed arbitrarily and automatically by applying Equation, result value $$(R) = \left((255 - s) * \left(\frac{D - (s + 1)}{255 - s}\right)^{(1/g1)}\right) + s,$$

to an upper value of an upper image level scaling and by applying Equation, result value $$(R) = (s) * \left(\frac{D}{s}\right)^{(g2)};$$

to a lower value of a lower image level scaling.

To achieve color coordinates x-0.3128, y-0.3292, which are white target values D65, of a display board due to influence of a color of an external light source, calculation of an x-axis value of color coordinate movement, which is color:

increases RED brightness when measurement point x-target point x=x' (constant*x'*illuminance intensity=RED control value) (x: color coordinate value, x': calculated color coordinate value) and if RED control value is positive (+), and increases RED brightness when measurement point x-target point x=x' (constant*x'*illuminance intensity=RED control value) and RED control value is negative (−), calculation of a y-axis value:

increases BLUE brightness when measurement point y−target point y=y' (constant*x'*illuminance intensity=GREEN/BLUE control value) and if GREEN/BLUE control value is +, and increases GREEN brightness when measurement point y−target point y=y' (constant*x'*illuminance intensity=GREEN/BLUE control value) and if GREEN/BLUE control value is −, when image data is increased by adding red, green, and blue ratio adjustment with fine adjustment, a carry-up occurs in hexadecimal FF, so the color coordinate processor limits a maximum value to FF (decimal number 255) when processing image data to implement color.

The sun altitude processor may calculate a solar altitude and azimuth of a display board installation location by calculating a solar elevation angle as follows:

Solar hour angle (h): One hour is calculated by 15 degrees, and 12 o'clock in midday altitude is 0 degrees, and (−) immediately before the midday altitude, and (+) immediately after the midday altitude Declination of sun (δ)=arc sin [sin(−23.33°)*cos (360°/365.24*($N$+10)+360°/π*0.0167*sin(360°/365.24)*($N$−2))]

Solar zenith angle (θ)=$a$ cos(sin φ*sin δ+cos φ*cos δ*cos $h$)

Solar elevation angle (α)=$a$ sin(sin φ*sin δ+cos φ*cos δ*cos $h$)

Solar azimuth (ϕ)

ϕ=$a$ cos(sin δ*cos φ−cos $H$*cos δ*sin φ)/sin θ(if a value of $h$ is greater than 0)

φ=360−$a$ cos((sin δ*cos φ−cos $H$*cos δ*sin φ)/sin θ(if a value of $h$ is smaller than 0).

A sunscreen shade of an LED and a sunscreen shade of an illuminance sensor may be equalized by matching an altitude angle of the sunscreen shade of the LED and an altitude angle of the sunscreen of the illuminance sensor so that measurement data of the illuminance sensor makes the form of sunlight illuminated on the LED of the LED screen the same, thereby increasing measurement accuracy.

Advantageous Effects

In accordance with the following embodiment of the present invention, the visibility can be improved by improving a displayed image by minimizing the difference in the characteristics of display elements (LED, etc.) according to the influence of external sunlight and artificial lighting and temperature.

In addition, the present invention can be applied to display devices such as an LED display board.

DESCRIPTION OF DRAWINGS

FIG. 1 illustrates an overall system configuration diagram of the present invention.

FIG. 2 illustrates a detailed block diagram of an environmental sensing/screen controller of FIG. 1.

FIG. 3 illustrates the case where sunlight is applied to the display board in FIG. 1.

FIG. 4 illustrates the forms of Rayleigh scattering and Mie scattering of sunlight applied to the display board of FIG. 3.

FIG. 5 illustrates an example of Rayleigh scattering by solar altitude applied to the display board of FIG. 3 by dividing it into noon and sunset.

FIG. 6 illustrates the color coordinates of sunlight measured at noon and sunset.

FIG. 7 illustrates red, green, blue, and white color coordinates, measured in the dark room and in the morning and afternoon, of a display board, particularly a movement state of color coordinates of a display board affected by sunlight.

FIG. 8 illustrates a weather information collection site for use in the present invention, where (a) is an example of a site screen and (b) is an example of altitude/direction.

FIG. 9 is a diagram illustrating the elevation angle of a display board, where (a) illustrates an angle range shaded by the height angle of an LED module sunscreen, and (b) illustrates an example of a sensor sunscreen attached to the top of a sensor artificially to match the height angle of the sensor sunscreen with an LED module.

FIG. 10 illustrates an operation flow chart of the present invention.

FIG. 11 illustrates an example of a display board environment value in the morning of a day. Specifically, (a) illustrates measurement values of temperature, fine dust, solar altitude, azimuth illuminance, and color coordinates by time, and (b) illustrates the color coordinates of sunlight shining on a display board.

FIG. 12 is a graph illustrating daily measured sunlight in color coordinates.

FIG. 13 illustrates an example of the video signal image level scaling of FIG. 2. Specifically, (a) is an example of reducing the low level and high level of the video signal by varying the video signal level of the present invention, (b) is an example of reducing the middle-level video signal, (c) is an example of reducing a video signal of a low level by performing image level scaling by setting an image level change reference value to 60 and setting upper and lower values.

FIG. 14 shows an image of Table 3.

BEST MODE

Embodiments of the present invention are provided for the purpose of explaining the technical idea of the present invention.

The scope of rights according to the present invention is not limited to the following embodiments or the specific description of the embodiments.

All technical terms and scientific terms used in the present invention have meanings commonly understood by those of ordinary skill in the art to which the present invention belongs unless otherwise defined. All terms used in the present invention are selected for the purpose of more clearly explaining the following invention and should not be understood as being selected to limit the scope of rights according to the present invention.

Expressions such as "comprising", "comprising" and "having" used in the present invention should be understood as open-ended terms that imply the possibility of including other embodiments unless otherwise stated in a phrase or sentence in which the expressions are included.

Expressions in the singular form described in the present invention may include plural meanings unless otherwise stated, and this is applied equally to expressions in the singular form described in the appended claims.

In the present invention, when an element is referred to as being "connected" to another element, it should be understood that the certain component can be directly connected or accessed to the other component, or that it can be connected or accessed through another new component.

In addition, direction indicators such as "front" used in the present invention are based on an x-axis direction of the accompanying drawings, and direction indicators such as "rear" and "back" refer to the opposite direction.

Hereinafter, an embodiment of an intelligent display board according to the present invention capable of increasing visibility by responding to external environmental factors in real time is described in detail with reference to the accompanying drawings.

In addition, a display board according to the present invention described below is described by taking the case of an outdoor display board that is affected by sunlight rather than indoor lighting as an external interference factor as an example. It is because only a very small special area of a display board installed indoors is affected by indoor lighting.

FIG. 1 is an overall system configuration diagram of the present invention.

As shown in the drawing, a display board 100 according to the present invention includes an LED screen 110, a controller 120 including sensors 122 consisting of sensors 122-1, 122-2 and 122-3 that collect external information affecting the LED screen 110 and detect illuminance, color coordinates, and temperature, respectively; and an AI control system configured to calculate an adjustment value for adjusting image data comprehensively with processors that generate data for driving the LED screen 110 based on information collected from the sensors 122, and an image processing controller 140 configured to adjust source video image data to a target value according to adjustment data of the controller 120.

The present invention having the above configuration may improve the image quality of a display board that is likely to be deteriorated by external environmental factors such as the effect of the sunlight on the LED screen 110 as the sunlight shines on the LED screen 110 and color changes caused by LED brightness changes due to the characteristics of LED when the ambient temperature is high or low.

FIG. 2 illustrates a detailed block diagram of the controller 120 of FIG. 1. FIG. 1 is described in more detail with reference to FIG. 2.

As shown in the drawings, the controller 120 includes the sensors 122-1, 122-2 and 122-3 for detecting illuminance, color coordinates and temperature, respectively.

The intensity and color of an external light source, i.e., sunlight, that affects the LED screen 110 of the display board are detected by the illuminance sensor 122-1 and the color coordinate sensor 122-2. For example, using a chroma meter is highly desirable as it can measure both illuminance and color coordinates at the same time. In addition, the image quality of the LED screen 110 of the display board is more affected when sunlight with high illuminance and sunlight with red color coordinates that deviate from the color adjusted to D65 are illuminated. In addition, the weather can change drastically due to clouds, etc., and instantaneous changes can occur due to nearby aircraft. If all of these cases are reflected, the display board can operate abnormally. Accordingly, it is desirable to determine the statistics of a certain time and the change value of a certain amount, and apply them after determining them. To run these operations, processor such as "an image level scaler 123" "a color coordinate processor 124" "a light data mixer & processor 125" "an LED temperature data lookup processor 126" and "a sun altitude processor 127" and an AI control system 128 are included.

The illuminance sensor 122-1 detects the intensity of light to respond to the influence of external light sources such as sunlight, and the color coordinate sensor 122-2 detects color.

To increase the visibility of an LED screen 110 which has become dim due to the low contrast due to the intensity of light, the image level scaler 123 sets a certain section of a video signal and selectively adjusts the video signal level by dividing the video signal level into low, medium, and high levels.

The color coordinate processor 124 reads the x, y color coordinates of a measured external light source, which will be described below, to determine whether or not it is close to a D65 coordinate. When it is close to the D65 coordinate, the calculation of the x, y coordinates is omitted, and when a coordinate value with a large color deviation is read, x, color correction is performed to calculate red, green, and blue data values required for coordinate movement.

The light data mixer & processor 125 adjusts and calculates the influence of an external light source by mixing a video image level change for an illuminance value of the external light source, which is an output of the image level scaler 123, and red, green, and blue data values of color coordinates of the external light source, which is an output of the color coordinate processor 124.

The LED temperature data lookup processor 126 calculates the altitude and azimuth of the sun and determines the state of sunlight effect by display board location information 129 and LED module sunscreen information 129-2 that forms a sun shade on a display board. When the altitude or azimuth of the sun described below does not affect the display board, calculation is performed to adjust only LED brightness by temperature without adjustment.

The AI control system 128 comprehensively manages output data of the light data mixer & processor 125 that adjusts and calculates the influence of external light sources, output data of the sun altitude processor 127 that calculates the altitude and azimuth information of the sun projected on the screen of the display board, and external use environment information of an LED display board, such as LED temperature characteristic information, inputted from the LED temperature sensor 122-3 to calculate comprehensive adjustment values.

The image processing controller 140 applies an adjustment value, which corresponds to the environment of the AI control system 128, to video source image data normally inputted to display an image from the LED screen 110.

FIG. 6 is a diagram illustrating the color coordinates of sunlight measured at noon and sunset, and FIG. 7 illustrates red, green, blue, and white color coordinates, measured in the dark room and in the morning and afternoon, of a display board, particularly a movement state of color coordinates of a display board affected by sunlight.

FIG. 6 is a schematic diagram of the x, y coordinates of the color coordinates of sunlight on a clear autumn day reflected on a display board, assuming that the display board of FIG. 1 is installed facing the south (see the color coordinates of sunlight on a day in autumn in Table 1).

As shown in the drawing, it can be seen that there are a lot of sunsets in the case of sunset, so red sunlight with a color temperature of 3500° k is shining on the display board, and it can be seen that sunlight with a color temperature of 5169° k is shining on the display board at noon.

FIG. 7 shows the color coordinates of Table 2 below, particularly shows the color x, y coordinates of a pure LED display board in a darkroom that is a laboratory and a display board where sunlight shines. It can be seen that the color reproduction range narrows because the brightness is shifted toward white.

TABLE 2

(Experimental measurement data of display board exposed to sunlight in the darkroom and morning and noon)

| Standard color | Darkroom Luminance (cd/m$^2$) | Darkroom Coordinates (color temperature) | Morning Luminance (cd/m$^2$) | Morning Coordinates (color temperature) | Noon Luminance (cd/m$^2$) | Noon Coordinates (color temperature) |
|---|---|---|---|---|---|---|
| Black | — | — | 1.257 | x-0.335<br>y-0.387<br>(5,425° K) | 2,079 | x-0.350<br>y-0.362<br>(4,872° K) |
| Red | 1,824 | x-0.666<br>y-0.308 | 2,717 | x-0.570<br>y-0.332 | 3,379 | x-0.505<br>y-0.336 |
| Green | 3,718 | | 4,729 | x-0.249<br>y-0.606 | 5,851 | x-0.288<br>y-0.522 |
| Blue | 702 | | 1,796 | x-0.180<br>y-0.145 | 2,959 | x-0.218<br>y-0.195 |
| White | 6,231 | | 7,143 | x-0.301<br>y-0.312<br>(7,428° K) | 7,639 | x-0.287<br>y-0.318<br>(7,464° K) |
| External illuminance | — | | 48,700 1x | | 85,000 1x | |

Table 2 and FIG. 7 also show measurement values of an LED display board when the display board installed in a south-facing direction is relatively affected by sunlight due to the short sunscreen. The measurement values are not absolute values and may differ depending on the weather of the day and the installation type of the display board.

It can be seen that the image quality of the display board may be degraded due to external influences. In addition, as in Korean Patent No. 0-0350306 (Patent Document 1) entitled "DISPLAY BOARD WHITE BALANCE MAINTENANCE DEVICE" applied by the present applicant, the brightness of the LED of the display board may change even at the same current according to the external temperature.

In particular, in the case of RED LED, it is necessary to compensate for the white balance deviating from the target value due to the characteristic of becoming bright at low temperature and darkening at high temperature. From this, it can be seen that the display board image quality is affected by lighting and temperature which are external environments. To improve these problems, the present invention has implemented the configurations shown in FIGS. 1 and 2.

FIG. 8 is a diagram illustrating a weather information collection site for use in the present invention, where (a) is an example of a site screen and (b) is an example of altitude/direction. FIG. 9 is a diagram illustrating the elevation angle of a display board, where (a) illustrates an angle range shaded by the height angle of an LED module sunscreen, and (b) illustrates an example of a sensor sunscreen attached to the top of a sensor artificially to match the height angle of the sensor sunscreen with an LED module.

As shown in the drawings, when the shade, shade from the sun, of the LED, which is an LED module of a display board, is equal to the shade of the sensor, accurate measurement is achieved because the measurement data of the sensor is the same as the sunlight shining on the LED of the LED module of the display board according to the configuration shown in FIGS. 1 and 2. A display board is greatly affected by sunlight according to the color coordinates of red series with a low color temperature, where the sun set, and illuminance that is the intensity of light. In addition, a dark-level image displayed on a display board is not visible when the illuminance is high, and the coordinates of the display color are moved in sunlight with a low color temperature, resulting in a phenomenon in which the white balance collapses. This should be adjusted so that the effect is less.

The light data mixer & processor 125 of FIG. 2 executes a function that adjusts and calculates the correlation between the illuminance of the sun and the color coordinates.

For example, when red-series sunlight with a low color temperature is illuminated on the LED screen 110 of the display board, a display board image containing red, which is a combination of sunlight and the display board LED light, is seen, so the display board is expressed by adjusting the white balance by subtracting red or adding blue and green. In the case of white, D65 is adjusted so that the color temperature is 6500° K.

When the sunscreen 130 is installed on the LED module of the LED screen 110 to block the sunlight as shown in FIG. 9, the sunlight is not directly illuminated by the LED that is a light-emitting element, so shade is formed at noon with high sun altitude as shown in FIG. 8, especially during the daytime in summer, whereby the effect is small. On the other hand, the LED is illuminated with direct light in winter or in the morning and evening when the sun is low, so there is a lot of light reflected from the LED screen 110 of the display board and a dark level of the image displayed on a display board is not shown, resulting in image quality deterioration. At this time, the image level scaler 123 in FIG. 2 adjusts the image data so that the difference between the dark part and the bright part is larger by setting a deviation between the image data to realize a clear screen, and, when a correction constant is determined according to the illuminance of the sunlight, a display board display image is adjusted so that white matches the color of the target coordinates according to the color of the sunlight, which is executed by the light data mixer & processor 125 of FIG. 2*s*.

FIG. 10 illustrates an operation flow chart of the present invention and is described with reference to FIG. 2.

As shown in the drawing, environmental information setting steps (S10, S20, S30, S40) of the display board are based on the color coordinate, illuminance, and temperature sensors 122-1, 122-2 and 122-3 of sunlight shining on the LED screen 110 of the display board, and for a display board location setting, the altitude and azimuth of the sun may be known by entering the installation location and direction (see FIGS. 8 and 9). This information is display board location and sunscreen information, and the four items correspond to environmental information.

When the white balance of the display board is based on 6500° K (coordinates x-0.3128, y-0.3292), which is D65, and sunset sunlight of 3500° K (coordinates x-0.4030, y-0.3864) is shined on the display board from a low altitude, red-type sunlight is mixed with a display board LED light and expressed, and sunlight similar to 6500° K is less affected.

Accordingly, when it is determined whether it is close to the D65 coordinate (S12) by reading the external x, y color coordinates values measured and input in step S10, the operation for the x, y coordinates is omitted, and when coordinates values with large color deviation (values away from D65 coordinates) are read, x, y color correction is performed according to the x, y coordinates compilation operation (S12) to calculate the red, green, and blue data values required for coordinates movement (S13). When the sunset light is illuminated, a function that subtracts red or adds blue and green is calculated, and a range similar to 6500° K is desirably determined by operating an actual display board to display white and setting the range according to the moving coordinates.

As the external illuminance value (S20) read from the illuminance sensor 122-1 is higher, low-level images are not visible, and image data needs to be adjusted through image level scaling (S21), and, if the function is adjusted so that there is a level difference by adding the deviation between the levels of the image data to be displayed (S14), a clearer screen may be implemented.

That is, a display board is affected by sunlight whose color is changed by red-series sunlight and by which low-level images cannot be seen due to illuminance, and the present invention compensates for the problems and performs temperature correction (S30) to ensure good image quality.

LED correction for temperature is similar to "DISPLAY BOARD WHITE BALANCE MAINTENANCE DEVICE" of Patent No. 10-0350306 of the present applicant, but LEDs have different temperature characteristics for each manufacturer. Accordingly, various LED temperature characteristics to be used may be memorized in the LED temperature data lookup processor 126 and selected, and a correction index that can be added or subtracted according to temperature may be calculated and provided to the AI control system 128.

The altitude and azimuth condition affecting the sunlight is determined by the position information of the display board and the sunscreen information (S40) forming the sun shade of the display board (S41), it is calculated (S15) so that only the LED brightness is corrected by temperature without an adjustment step (S42) when the altitude or azimuth of the sun does not affect the display board, and when the input source image signal is adjusted to the environmental information calculation value (S16) and displayed on the display board, the improved image is displayed on the LED screen 110, a display board display surface, resulting in image quality improvement.

The equations for calculating the azimuth and altitude of the display board are as follows:

Declination of the Sun (δ): Angle between the sun's changing light and the equator Latitude of region (φ, latitude)

Longitude of region

Hour angle (h): 1 hour is calculated by 15 degrees, and 12 o'clock in midday altitude is 0 degrees, (−) immediately before the midday altitude, and (+) immediately after the midday altitude.

Solar zenith angle (θ): Angle between the zenith (sky) and the sun

Solar elevation angle (α): Angle (90−θ) between the ground and the sun

Solar azimuth angle (ϕ): Set clockwise from north (north>east>south>west), opposite to the direction of xyz coordinates.

The solar declination calculation formula is as follows:

$$\delta = \arcsin\,[\sin(-23.33^\circ) * \cos(360^\circ/365.24 * (N+10)) + 360^\circ/\pi * 0.0167 * \sin(360^\circ/365.24) * (N-2))]$$

In the formula, N is the day of the year starting with N=0 at midnight Universal Time (UT) when January 1 begins.

Solar Hour Angle Calculation Formula (h)

The solar hour angle is calculated as − in the morning and + in the afternoon, based on 0 degrees of the straight line.

At 10:30 AM, it is −22.5 (15° per hour*1.5 hours before noon)

In the case of the longitude value, a correct altitude value can be calculated only when it is corrected based on the standard time position.

Solar Elevation Angle (α) Calculation Formula $$\theta = a\cos(\sin\varphi * \sin\delta + \cos\varphi * \cos\delta * \cos h)$$

$$\alpha = a\sin(\sin\varphi * \sin\delta + \cos\varphi * \cos\delta * \cos h)$$

Calculation Formula For Solar Azimuth (ϕ)

If the value of h is greater than 0, the value is displayed as it is.

$$\phi = a\cos((\sin\delta * \cos\varphi - \cos H * \cos\delta * \sin\varphi)/\sin\theta$$

If the value of h is less than 0, it is calculated and expressed as follows:

$$\phi = 360 - a\cos((\sin\delta * \cos\varphi - \cos H * \cos\delta * \sin\varphi)/\sin\theta$$

FIG. 11 is a diagram showing an example of a display board environment value in the morning of a day. Specifically, (a) illustrates measurement values of temperature, fine dust, solar altitude, azimuth illuminance, and color coordinates by time, and (b) illustrates the color coordinates of sunlight shining on a display board. FIG. 12 is a graph illustrating daily measured sunlight in color coordinates.

As shown in FIG. 11, temperature, weather, fine dust, solar altitude and azimuth, and the illuminance, color coordinates, and color temperature of sunlight illuminated on the display board were measured at 10-minute intervals from 8:31 am to 12:51 am during the winter season, and it can be seen that sunlight with a low color temperature shines on the display board as the sun shines at 8:51, and the color temperature decreases as the sun altitude increases to noon, and when the sunlight is covered by clouds, the color temperature also decreases.

This information may be stored in the AI control system 128 in FIG. 2 and used as big data, and may also be used as data, such as the temperature data and the amount of sunlight, used for the display board. The AI control system 120 collects and manages the external usage environment information of the display board, and also informs the manager of the fire risk when extreme temperature is detected. Such comprehensive information may be utilized as big data and may be utilized as basic data when designing a display board or newly installing a display board in a current installation location.

Environmental information such as illuminance and chromaticity due to external lighting such as the sun, temperature used, and solar altitude and orientation information are collected by the controller 120 in FIG. 2 and calculated to adjust a display board, and the adjusted and calculated data is sent from the AI control system 128 of the controller 120 to the image processing controller 140, and the image processing controller 140 applies it to the video source video signal (data) and displays it on the LED screen 110 of the display board, thereby showing an image to which the present invention is applied.

Meanwhile, table 3 below shows movement examples of color coordinates. In Table 3, color coordinates are measured like measurement coordinates, and to move to a target point, it is moved by increasing BLUE or decreasing RED. For accurate location, it is possible to add or subtract GREEN, and it is executed with the following operation.

[Table 3]

Coordinate Movement Example

The corresponding table image is shown in FIG. 14.

1) Calculation of X-Axis Value

If measurement point x−target point x=x,' constant*x'*illuminance intensity=RED control value

If the RED control value is +, the RED brightness is reduced.

If the RED control value is −, the RED brightness is increased (when RED is increased, a carry-up occurs in hexadecimal FF, so the maximum value is limited to FF when processing image data).

2) Calculation of Y-Axis Value

If measurement point y−target point y=y,' constant*x'*illuminance intensity=GREEN/BLUE control value

If the GREEN/BLUE control value is +, the BLUE brightness is increased.

If the GREEN/BLUE control value is −, the GREEN brightness is increased (a carry-up occurs in hexadecimal FF if it is increased, so the maximum value is limited to FF when processing image data).

By adjusting in such a manner, coordinates may be moved. For accurate adjustment, it is not limited to the formula, but it is necessary to adjust the ratio of red, green, and blue. This calculation calculates basic values in the color coordinates processor 124 in FIG. 2, and a detailed calculation considering illuminance is performed in the light data mixer & processor 125.

And, when the sunlight of low altitude shines directly on the surface of an LED screen of a display board, the contrast is lowered and the image of low brightness is blurred and invisible. In this case, the image level scaler 123 in FIG. 2 adjusts the image signal to improve visibility. This will be explained with reference to FIG. 13.

FIG. 13 is an example of the video signal image level scaling of FIG. 2. Specifically, (a) is an example of reducing the low level and high level of the video signal by varying the video signal level of the present invention, (b) is an example of reducing the middle-level video signal, (c) is an example of reducing a video signal of a low level by performing image level scaling by setting an image level change reference value to 60 and setting upper and lower values.

As shown in the drawing, FIG. 13 explains how to increase visibility when sunlight shines on a display board. Specifically, (a) is a graph for general gamma correction of video signals (for gamma correction considering CRT characteristics and human visibility), and, unlike this general correction, the present invention divides the level of each 8-bit video signal of red, green, and blue (R, G, B) and adds it to the video signal for each video signal section to raise the level or lower the lower level to reduce the level between the video signals, thereby expanding a brightness width between video signals to increase visibility (in the present invention, 8-bit is described, but if the source is 10-bit or 12-bit, it can be extended and is not limited to 8-bit).

Assuming that the signal level is exactly divided into two stages, upper and lower stages, it can be divided into the binary number 00000000-01111111 (decimal number 0-127) and the binary number 1000000011111111 (decimal number 128-255) as shown in (a) and (b) of FIG. 13, but FIG. 13(*c*) is classified at the low level, the image level is changed by dividing the video signal gray scale at decimal number 60 out of 255 decimal levels, the video data below 60 is lowered to offset the invisible part due to the influence of sunlight, and the image level is scaled. The image level scale formula is as follows:

For the first variable, if the upper image level index is g1, the sub-image level index is g2, the image level change reference value (inflection point) is s, and each data of video input RGB data is D, it is processed by the following formula:

an upper image level scaling of a video signal is calculated by the formula of result value $$(R) = \left((255 - s) * \left(\frac{D - (s+1)}{255 - s}\right)^{(1/g1)}\right) + s,$$

and a lower image level scaling of a video signal is calculated by the formula of result value $$(R) = (s) * \left(\frac{D}{s}\right)^{(g2)}.$$

When the R value from the result value is converted into each RGB data of the output and outputted, the image level of the video data is scaled.

Therefore, the variable may change the following three factors:

① upper image level index g1

② sub-image level index g2'

③ image level change standard value (inflection point) s, and may be artificially set or automatically changed according to an installation place or the brightness of a display board.

For example, when automatic execution is performed for the low-level reduction of FIG. 13(*c*), and the settings for the morning with low sun altitude and evening sunset are the same as (c), and when it is cloudy or when the altitude of the sun rises to act as a sunscreen, even low-level images can be seen well. Accordingly, if set as (c), the quality of the image is rather deteriorated, so it is necessary to lower a lower value or change the inflection point. This behavior can be changed automatically.

(a), (b) and (c) of FIG. 13 are various transformations for scaling the image level, and an appropriate section may be set as needed.

In FIG. 13, (a) is used to lower low luminance and high luminance levels when adjusting a video signal, and (b) is used to reduce a video signal of medium luminance level.

Accordingly, a power-saving effect may be obtained by adjusting the video data of some sections or by adjusting the level of a video signal in an unnecessary part with low visibility.

These various functions may be included in an operation program and selected by an operator.

The present invention is to improve image quality deterioration in which the color of a display board is changed by sunlight or lighting or the image of a display board is blurred due to the reflection of sunlight, and may be applied to improve image quality in a display board that is not affected by sunlight.

INDUSTRIAL APPLICABILITY

The present invention can be applied to all display boards or display devices and can increase the visibility of image quality without being affected by external light sources.

DESCRIPTION OF SYMBOLS

100: intelligent display board
110: LED screen
120: controller
122: sensor
122-1: illuminance sensor
122-2: color coordinate sensor
122-3: temperature sensor
123: image level scaler
124: color coordinate processor
125: light data mixer & processor
126: LED temperature data lookup processor
127: sun altitude processor
128: AI control system
130: sunscreen
140: image processing controller

The invention claimed is:

1. An intelligent display board capable of increasing visibility by responding to external environmental factors in real time, comprising:

a Light Emitting Diode (LED) screen;

a controller comprising sensors configured to collect external information affecting the LED screen and detect illuminance, color coordinates, and temperature, respectively; and an Artificial Intelligence (AI) control system configured to calculate an adjustment value by adjusting image data comprehensively with a processor configured to generate data to drive the LED screen by information respectively collected from the sensors; and an image processing controller configured to display an image with improved image quality on the LED screen by applying an adjustment value corresponding to an environment of the AI control system to video source image data, wherein the controller comprises:

sensors comprising an illuminance sensor, color coordinate sensor, and temperature sensor to respectively detect illuminance, color, and temperature of light, respectively, so as to respond to an influence of the external environmental factors;

an image level scaler configured to set a certain section of a video signal and to selectively adjust a video signal level by distinguishing low, medium, and high levels so as to increase the visibility of the LED screen, which has been dimmed due to a lowered contrast, to an intensity of light measured from the illuminance sensor;

a color coordinate processor configured to, when determining whether the color coordinate processor is near D65 coordinates by reading x, y color coordinates of an external light source measured from the color coordinate sensor, calculate red, green, and blue data values necessary for moving coordinates by omitting an operation for x, y coordinates and, when coordinate values with a large color deviation are read, by executing x, y color correction;

a light data mixer & processor configured to adjust and calculate the influence of external light sources such as sunlight or lighting by mixing a video image level change for an illuminance value of an external light source output from the image level scaler and red, green, and blue data values of external light source color coordinates output from the color coordinate processor;

a sun altitude processor configured to calculate an altitude and azimuth of sun, which is an external light source, by determining a state of sunlight influence by a display board location information and LED module sunscreen information that forms a display board sun shade, and to perform a calculation to adjust only an LED brightness by temperature without adjustment when the altitude or azimuth of the sun has no effect on a display board;

an LED temperature data lookup processor configured to memorize several LED temperature characteristics and to calculate correction data that can be added or subtracted according to a temperature measured from the temperature sensor; and the AI control system is configured to calculate a comprehensive adjustment value by integrating output data of the light data mixer & processor, output data of the sun altitude processor, LED temperature characteristic information, and external use environment information of a display board.

2. The intelligent display board according to claim 1, wherein the image level scaler uses, as variables, an upper image level g1, an upper image level g2 and an image level change reference value s for distinguishing between upper and lower image levels, in response to influence of external light source illuminance, and a level of a video signal is changed arbitrarily and automatically by applying an equation resulting in a value of $$(R) = \left((255 - s) * \left(\frac{D - (s+1)}{255 - s}\right)^{(1/g1)}\right) + s,$$

D being a standard illuminant, to an upper value of an upper image level scaling and by applying Equation, result value $$(R) = (s) * \left(\frac{D}{s}\right)^{(g2)};,$$

to a lower value of a lower image level scaling.

3. The intelligent display board according to claim 1, wherein, to achieve color coordinates x-0.3128, y-0.3292, which are white target values D65, of a display board due to influence of a color of an external light source, calculation of an x-axis value of color coordinate movement, which is color:

increases RED brightness when measurement point x-target point x=x' (constant*x'*illuminance intensity=RED control value) and if RED control value is positive (+) (x: color coordinate value, x': calculated color coordinate value), and increases RED brightness when measurement point x-target point x=x' (constant*x'*illuminance intensity=RED control value) and RED control value is negative (−), calculation of a y-axis value:

increases BLUE brightness when measurement point y-target point y=y' (constant x'*illuminance intensity=GREEN/BLUE control value) and if GREEN/BLUE control value is +, and increases GREEN brightness when measurement point y-target point y=y' (constant*x'*illuminance intensity=GREEN/BLUE control value) and if GREEN/BLUE control value is −, when image data is increased by adding red, green, and blue ratio adjustment with fine adjustment, a carry-up occurs in hexadecimal FF, so the color coordinate processor limits a maximum value to FF (decimal number 255) when processing image data to implement color.

4. The intelligent display board according to claim 1, wherein the sun altitude processor calculates a solar altitude and azimuth of a display board installation location by calculating a solar elevation angle as follows:

Solar hour angle (h): One hour is calculated by 15 degrees, and 12 o'clock in midday altitude is 0 degrees, and (−) immediately before the midday altitude, and (+) immediately after the midday altitude $$\text{Declination of sun } (\delta) = \text{arc sin } [\sin(-23.33°) * \cos(360°/365.24 * (N+10) + 360°/\pi * 0.0167 * \sin(360°/365.24) * (N-2))]$$

$$\text{Solar zenith angle } (\theta) = a \cos(\sin \varphi * \sin \delta + \cos \varphi * \cos \delta * \cos h)$$

$$\text{Solar elevation angle } (\alpha) = a \sin(\sin \varphi * \sin \delta + \cos \varphi * \cos \delta * \cos h)$$

Solar azimuth (Φ)

$$\Phi = a \cos(\sin \delta * \cos \varphi - \cos H * \cos \delta * \sin \varphi) / \sin \theta \text{ (if a value of } h \text{ is greater than 0)}$$

$$\Phi = 360 - a \cos((\sin \delta * \cos \varphi - \cos H * \cos \delta * \sin \varphi) / \sin \theta \text{ (if a value of } h \text{ is smaller than 0).}$$

5. The intelligent display board according to claim 1, wherein a sunscreen shade of a Light Emitting Diode (LED) and a sunscreen shade of an illuminance sensor are equalized by matching an altitude angle of the sunscreen shade of the LED and an altitude angle of the sunscreen shade of the illuminance sensor so that measurement data of the sunscreen shade of the illuminance sensor makes a form of sunlight illuminated on the LED of the LED screen identical, thereby increasing measurement accuracy.

* * * * *